United States Patent
Kandori et al.

(10) Patent No.: US 8,928,203 B2
(45) Date of Patent: Jan. 6, 2015

(54) CAPACITIVE ELECTROMECHANICAL TRANSDUCER

(75) Inventors: Atsushi Kandori, Ebina (JP); Makoto Takagi, Yokohama (JP); Masao Majima, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 13/377,925

(22) PCT Filed: Jun. 15, 2010

(86) PCT No.: PCT/JP2010/003974
§ 371 (c)(1),
(2), (4) Date: Dec. 13, 2011

(87) PCT Pub. No.: WO2010/146838
PCT Pub. Date: Dec. 23, 2010

(65) Prior Publication Data
US 2012/0086307 A1    Apr. 12, 2012

(30) Foreign Application Priority Data
Jun. 19, 2009 (JP) ................. 2009-146936

(51) Int. Cl.
*A61B 6/00* (2006.01)
*H02N 1/00* (2006.01)
*B06B 1/02* (2006.01)

(52) U.S. Cl.
CPC ................... *B06B 1/0292* (2013.01)
USPC ........................ 310/309; 600/447

(58) Field of Classification Search
USPC ............... 310/309, 334; 600/447; 438/22, 48
See application file for complete search history.

(56) References Cited

U.S. PATENT DOCUMENTS

| | | | |
|---|---|---|---|
| 6,605,043 B1* | 8/2003 | Dreschel et al. | 600/459 |
| 7,982,362 B2* | 7/2011 | Adachi et al. | 310/309 |
| 2003/0149363 A1* | 8/2003 | Dreschel et al. | 600/437 |
| 2004/0113524 A1 | 6/2004 | Baumgartner | |
| 2008/0064959 A1* | 3/2008 | Kanda et al. | 600/459 |
| 2008/0152172 A1 | 6/2008 | Matsuzawa | |
| 2009/0001846 A1* | 1/2009 | Bedillion et al. | 310/309 |

FOREIGN PATENT DOCUMENTS

| | | |
|---|---|---|
| EP | 16714589 A1 | 6/2006 |
| JP | 2003-527947 A | 9/2003 |
| JP | 2004-274756 A | 9/2004 |
| WO | WO02/25630 A2 | 3/2002 |
| WO | 2005/032374 A | 4/2005 |
| WO | 2007/055320 A | 5/2007 |
| WO | 2009/037655 A2 | 3/2009 |

OTHER PUBLICATIONS

Caronti et al. "Electromechanical coupling factor of capacitive micromachined ultrasonic transducers", Acoustical Society of America, vol. 113, No. 1, Jan. 2003, pp. 279-288.

* cited by examiner

*Primary Examiner* — Thomas Dougherty
(74) *Attorney, Agent, or Firm* — Canon USA, Inc. IP Division

(57) ABSTRACT

The present invention relates to an electromechanical transducer capable of arbitrarily varying the amount of deflection of a vibrating membrane for every element.
The electromechanical transducer includes a plurality of elements including at least one cell that includes a first electrode and a second electrode opposed to the first electrode with a gap sandwiched therebetween and a direct-current voltage applying unit configured to be provided for each element and to separately apply a direct-current voltage to the first electrodes in each element. The first electrodes and the second electrodes are electrically separated for every element.

19 Claims, 7 Drawing Sheets

CAPACITIVE ELECTROMECHANICAL TRANSDUCER

TECHNICAL FIELD

The present invention relates to a capacitive electromechanical transducer, such as a capacitive micromachined ultrasonic transducer.

BACKGROUND ART

Capacitive micromachined ultrasonic transducers (CMUTs) are proposed as electromechanical transducers that perform at least either of transmission and reception of ultrasonic waves (for example, refer to PCT Japanese Translation Patent Publication No. 2003-527947). The CMUTs are manufactured by using a Micro Electro Mechanical Systems (MEMS) process to which a semiconductor process is applied.

FIG. 7 is a schematic cross-sectional view of a typical CMUT. Referring to FIG. 7, a set of a first electrode 102 and a second electrode 105 is called a cell. The first electrode 102 is opposed to the second electrode 105 with a vibrating membrane 101 and a gap 104 sandwiched therebetween. The vibrating membrane 101 is supported by a supporter 103 formed on a substrate 106. All the first electrodes 102 are electrically connected to each other in the CMUT. A certain level of direct-current (DC) voltage is uniformly applied to the first electrode 102 so that a desired potential difference is generated between the first electrode 102 and the second electrode 105. The second electrodes 105 are electrically separated for every element (a collection of cells). An alternating-current (AC) drive voltage is applied to the second electrode 105 to produce an AC electrostatic attraction between the first and second electrodes, which vibrates the vibrating membrane 101 at a certain frequency to transmit ultrasonic waves. In addition, the vibrating membrane 101 vibrates in response to the ultrasonic waves that are received to generate a minute electric current caused by electrostatic induction at the second electrode 105. The value of the electric current can be measured to acquire a reception signal for every element.

The characteristics in the transmission and reception of ultrasonic waves are determined by the amount of deflection of the vibrating membrane 101 when the DC voltage is applied to the first electrodes 102. The pressure in the gap 104 of each cell is normally lower than the atmospheric pressure, and the vibrating membrane 101 is deflected toward the substrate 106 due to the difference between the atmospheric pressure and the pressure in the gap 104. The amount of deflection of the vibrating membrane 101 is determined by mechanical characteristics based on parameters including the size, shape, thickness, and material of the vibrating membrane 101. When the CMUT is operated, in order to increase the efficiency of the transmission and reception of ultrasonic waves, a certain potential difference is applied between the two electrodes to cause an electrostatic attraction between the electrodes. The vibrating membrane 101 is further deflected toward the substrate 106 due to this electrostatic attraction. In the transmission of ultrasonic waves, the efficiency of the transmission and reception is increased with the decreasing distance between the electrodes because the electrostatic attraction is in inverse proportion to the square of the distance. In contrast, in the reception of ultrasonic waves, the efficiency of the transmission and reception is also increased with the decreasing distance between the electrodes because the magnitude of the detected minute electric current is in inverse proportion to the distance between the electrodes and is in proportion to the potential difference between the electrodes.

CITATION LIST

Patent Literature

PTL 1: PCT Japanese Translation Patent Publication No. 2003-527947

SUMMARY OF INVENTION

However, increasing the potential difference between the two electrodes causes a force caused by the electrostatic force and the difference in pressure between the electrodes to exceed the restoration force of the mechanical characteristics of the vibrating membrane. As a result, the vibrating membrane is in contact with the electrode on the substrate to make a collapse state and, thus, the characteristics of the CMUT are greatly varied. Accordingly, when the CMUT is normally operated (is not driven in the collapse state), the potential difference between the electrodes is set so that a high efficiency of the transmission and reception is achieved and the vibrating membrane has an amount of deflection that does not cause the collapse state.

All the first electrodes are electrically connected to each other in the CMUT in related art. Accordingly, a uniform voltage is applied to the first electrodes during the operation of the CMUT. Since the above-mentioned parameters of the vibrating membranes are varied due to various factors in manufacture in the CMUT, a variation in the amount of deflection of the vibrating membrane is caused even with no potential difference between the electrodes. In addition, the amount of deflection of the vibrating membrane during the operation of the CMUT is also varied.

As a result, the efficiency of the transmission and reception is shifted from an expected value and/or the collapse state is sometimes caused in some of the cells to greatly vary the transmission and reception characteristics for every element. In order to resolve the above problems, the present invention provides a capacitive electromechanical transducer capable of arbitrarily varying the amount of deflection of the vibrating membrane for every element.

According to an embodiment of the present invention, an electromechanical transducer includes a plurality of elements including at least one cell that includes a first electrode and a second electrode opposed to the first electrode with a gap sandwiched therebetween and a direct-current voltage applying unit configured to be provided for each element and to separately apply a direct-current voltage to the first electrodes in each element. The first electrodes and the second electrodes are electrically separated for every element.

According to the present invention, it is possible to arbitrarily adjust the amount of deflection of the vibrating membrane in the electromechanical transducer for every element.

DESCRIPTION OF EMBODIMENTS

Capacitive electromechanical transducers according to embodiments of the present invention will herein be described in detail with reference to the attached drawings.

First Embodiment

Figure 1:
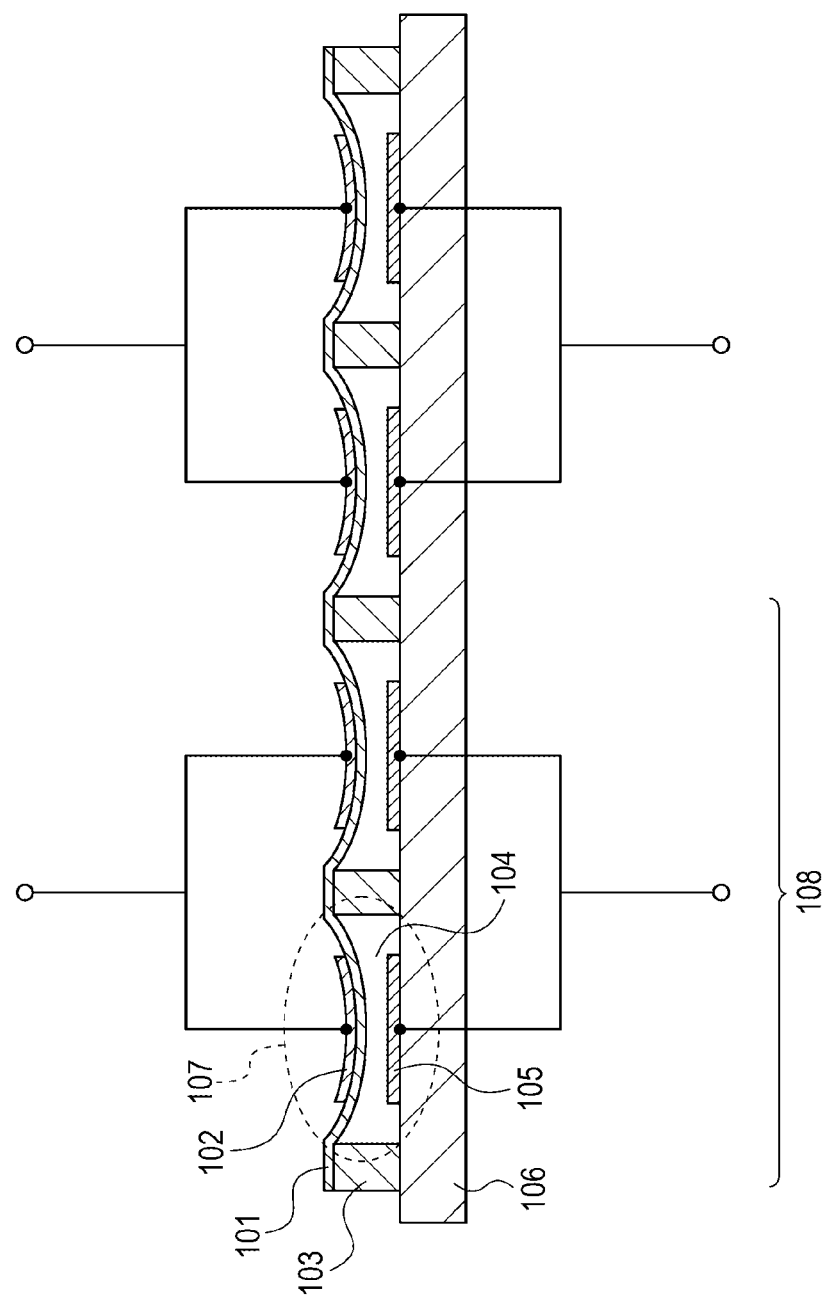
FIG. 1 is a schematic cross-sectional view of an electromechanical transducer according to a first embodiment of the present invention.

FIG. 1 is a schematic cross-sectional view of an electromechanical transducer according to a first embodiment of the present invention. The first electrode is called an upper electrode and the second electrode is called a lower electrode in the embodiments of the present invention. A vibrating membrane 101 on which an upper electrode 102 is formed is supported by a supporter 103 formed on a substrate 106. The vibrating membrane 101 vibrates along with the upper electrode 102. A lower electrode 105 is formed on the substrate 106 at a position that is opposed to the upper electrode 102 on the vibrating membrane 101 with a gap 104 sandwiched therebetween. A composition including the upper electrode and the lower electrode, which are opposed to each other with the gap 104 sandwiched therebetween, is called a cell 107 in the embodiments of the present invention. An element 108 includes at least one cell 107. Specifically, the element 108 is a composition including one cell 107 or including multiple (at least two) cells that are electrically connected (connected in parallel) to each other. Although two cells compose one element in FIG. 1, the present invention is not limited to this configuration. Multiple cells may be connected to each other in a two-dimensional array pattern. Multiple (two or more) elements are formed in the electromechanical transducer.

The upper electrode used in the embodiments of the present invention may be made of at least one kind of metals including aluminum (Al), chromium (Cr), titanium (Ti), gold (Au), platinum (Pt), copper (Cu), silver (Ag), tungsten (W), molybdenum (Mo), tantalum (Ta), and Nickel (Ni) and alloys including AlSi, AlCu, AlTi, MoW, and AlCr. The upper electrode may be provided on at least one of on the upper face of the vibrating membrane, on the rear face of the vibrating membrane, and inside the vibrating membrane or, when the vibrating membrane is made of a conductive material or a semiconductor material, the vibrating membrane itself may serve as the upper electrode. The lower electrode used in the embodiments of the present invention may be made of the same metal or alloy as that of the upper electrode. When the substrate is made of a semiconductor material, such as silicon, the substrate may serve as the lower electrode.

Figure 2:
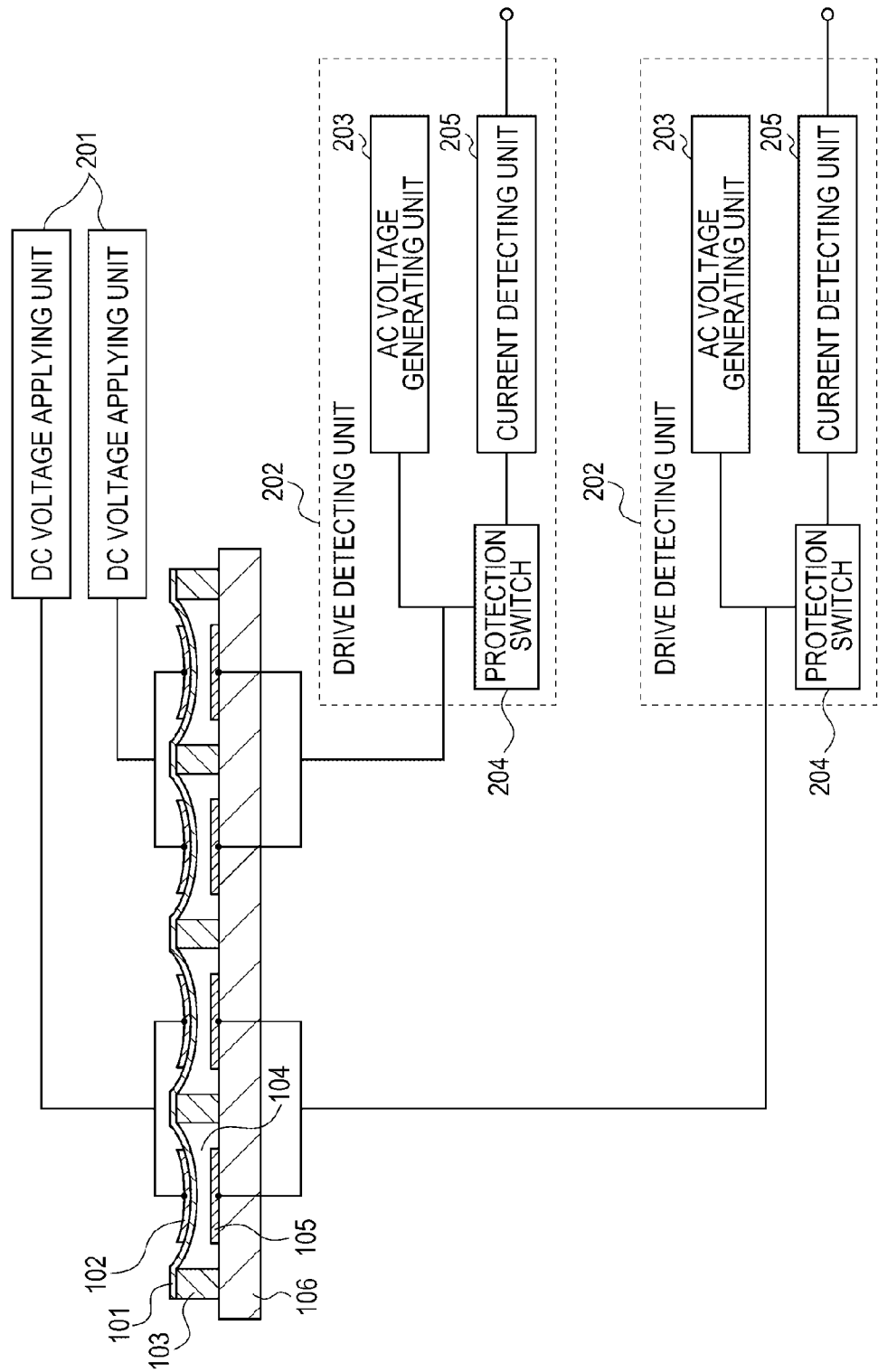
FIG. 2 illustrates an example of the configuration of the electromechanical transducer according to the first embodiment of the present invention.

FIG. 2 illustrates an example of the configuration of the electromechanical transducer according to the first embodiment of the present invention. The electromechanical transducer according to the first embodiment is characterized in that not only the lower electrodes 105 but also the upper electrodes 102 are electrically separated for every element. In each element, the multiple upper electrodes 102 are electrically connected to each other and the multiple lower electrodes 105 are electrically connected to each other. Although the upper electrodes in each element are separately formed for every cell and are electrically connected to each other via wiring lines (not shown) formed on the vibrating membrane in the first embodiment, one upper electrode may be formed for every element. The lower electrodes may also be separately formed for every cell, as in the first embodiment, or one lower electrode may be formed for every element.

A DC voltage applying unit 201 is connected to the upper electrodes 102 in each element. The DC voltage applying unit 201 applies a desired level of voltage to the upper electrodes for every element to cause a potential difference from the voltage of the lower electrodes between the upper and lower electrodes. The amount of deflection of the vibrating membranes 101 is determined by this potential difference. A drive detecting unit 202 is connected to the lower electrodes 105 in each element. The drive detecting unit 202 includes an AC voltage generating unit 203, a current detecting unit 205, and a protection switch 204.

When the electromechanical transducer includes N-number elements, the DC voltage applying units 201 of the N-number are included in the configuration of the first embodiment. The drive detecting units 202 of the same number as that of the elements are also included in the configuration of the first embodiment.

An operation of each drive detecting unit 202 in transmission of ultrasonic waves and an operation thereof in reception of ultrasonic waves will now be described. In the transmission of ultrasonic waves, an AC voltage is applied by the AC voltage generating unit 203 connected to the lower electrodes 105. The application of the AC voltage causes an AC potential difference between the upper electrodes 102 and the lower electrodes 105 to produce an AC electrostatic attraction on the vibrating membrane 101. The electrostatic attraction causes the vibrating membrane 101 to vibrate to transmit the ultrasonic waves. Since the protection switch 204 connected to the lower electrodes 105 is turned off in the transmission of the ultrasonic waves, an input part of the current detecting unit 205 is protected from the voltage generated by the AC voltage generating unit 203.

In the reception of ultrasonic waves, the AC voltage generating unit 203 is in a high-impedance state and has no effect on the electric potential of the lower electrodes 105. The protection switch 204 is turned on to connect the lower electrodes 105 to an input part of the AC voltage generating unit 203. The ultrasonic waves that are externally applied cause the vibrating membrane 101 to vibrate to vary the electrostatic capacitance between the upper and lower electrodes. Since the upper electrodes are fixed to a certain electric potential, the induction charge occurring at the lower electrodes 105 causes a minute electric current to pass through the wiring line for the lower electrodes 105. A variation in the minute electric current can be detected by the current detecting unit 205 to detect the magnitude of the ultrasonic wave causing the variation in the capacitance. The electric potential of the lower electrodes is fixed to a certain value by the drive detecting unit 202 except when ultrasonic waves are transmitted.

Since not only the lower electrodes but also the upper electrodes are electrically separated for every element and the DC voltage applying unit is connected to the upper electrodes for every element in the configuration of the first embodiment, it is possible to separately apply the DC voltage to the upper electrodes in each element. Accordingly, different electrostatic attractions can be applied to different elements to adjust the amount of deflection of the vibrating membranes. Consequently, it is possible to reduce the variation in the transmission and reception characteristics of the ultrasonic waves.

Although the DC voltage applying unit 201 is connected to the upper electrodes 102 and the current detecting unit 205 is connected to the lower electrodes 105 in the first embodiment, the DC voltage applying unit may be connected to the lower electrodes and the current detecting unit may be connected to the upper electrodes. In addition, the configuration of the drive detecting unit is not limited to the one described in this description, another configuration, only the configuration used for the transmission, or only the configuration used for the reception may be used.

Second Embodiment

A second embodiment of the present invention will now be described with reference to FIG. 3. The second embodiment concerns the configuration of wiring lines from the upper electrodes and the lower electrodes. The remaining configuration in the second embodiment is the same as in the first embodiment.

Figure 3:
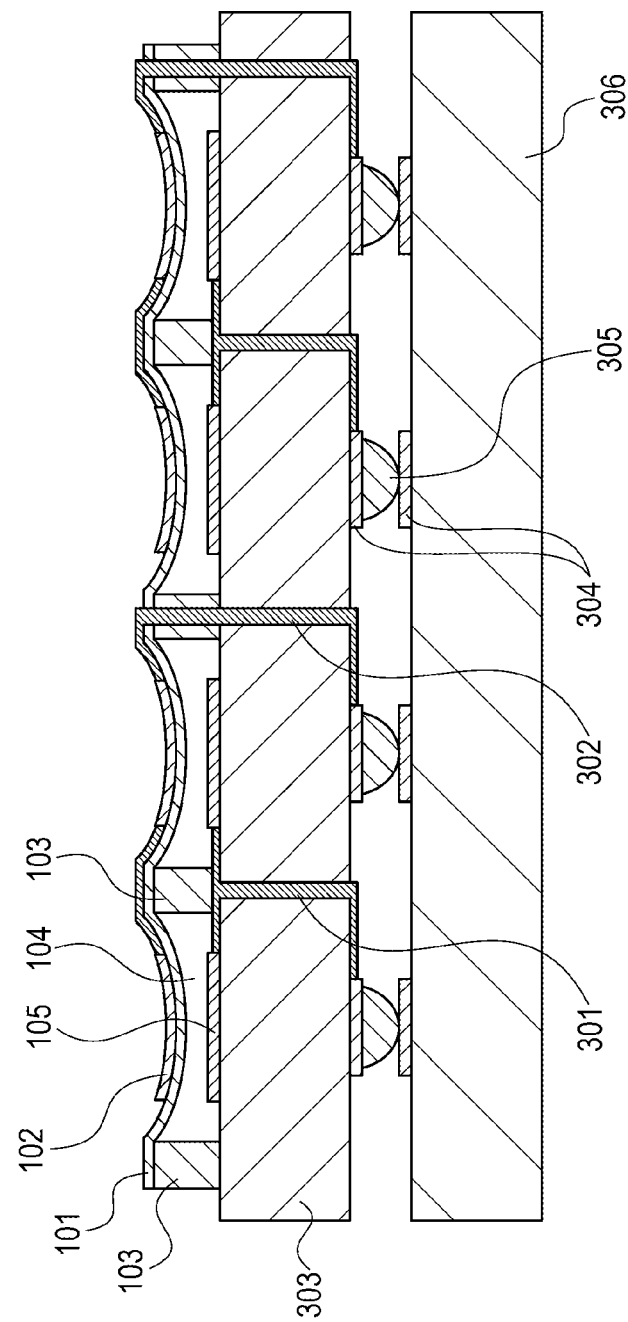
FIG. 3 is a cross-sectional view of an electromechanical transducer according to a second embodiment of the present invention.

FIG. 3 is a cross-sectional view of an electromechanical transducer according to the second embodiment of the present invention. A through wiring line substrate 303 includes two kinds of wiring lines passing through the substrate: a lower-electrode through wiring line 301 (second-electrode through wiring line) and an upper-electrode through wiring line 302 (first-electrode through wiring line). All the lower electrodes 105 in each element are connected to one lower-electrode through wiring line 301. The lower-electrode through wiring line 301 extends from the face of the through wiring line substrate 303 toward the lower electrodes to the face thereof toward a printed circuit board to be connected to the corresponding bump electrode 304. The upper electrodes 102 in each element are also connected to one upper-electrode through wiring line 302, which is connected to the corresponding bump electrode 304.

A bump 305 is formed on each of the bump electrodes 304 formed on the face of the through wiring line substrate 303 toward the printed circuit board. The lower-electrode through wiring line 301 and the upper-electrode through wiring line 302 are connected to wiring lines on a printed circuit board 306 via the bumps 305. An electrical signal from each of the lower electrodes 105 is supplied to the drive detecting unit 202 through the wiring line on the printed circuit board 306 electrically connected to the lower-electrode through wiring line 301. An electrical signal from each of the upper electrode 102 is supplied to the DC voltage applying unit 201 through the wiring line on the printed circuit board 306 electrically connected to the upper-electrode through wiring line 302.

The configuration in the second embodiment is characterized by the presence of the lower-electrode through wiring lines 301 and the upper-electrode through wiring lines 302 of the same number as that of elements. The presence of the lower-electrode through wiring lines 301 and the upper-electrode through wiring lines 302 of the same number as that of elements allows the wiring lines for the upper electrodes to be led to the rear face of the through wiring line substrate with the wiring lines for the upper electrodes 102 separated for every element even when the multiple elements are provided. Accordingly, it is possible to connect the wiring lines for the upper electrodes to the multiple DC voltage applying units 201 with little reduction in the area of the elements used for the transmission and reception of ultrasonic waves (with little reduction in the efficiency of the transmission and reception).

Third Embodiment

A third embodiment of the present invention will now be described with reference to FIG. 4. The third embodiment is characterized in that a control-signal generating unit is provided to instruct a DC voltage to be applied to the DC voltage applying unit 201. The remaining configuration in the third embodiment is the same as in either of the first and second embodiments.

Figure 4:
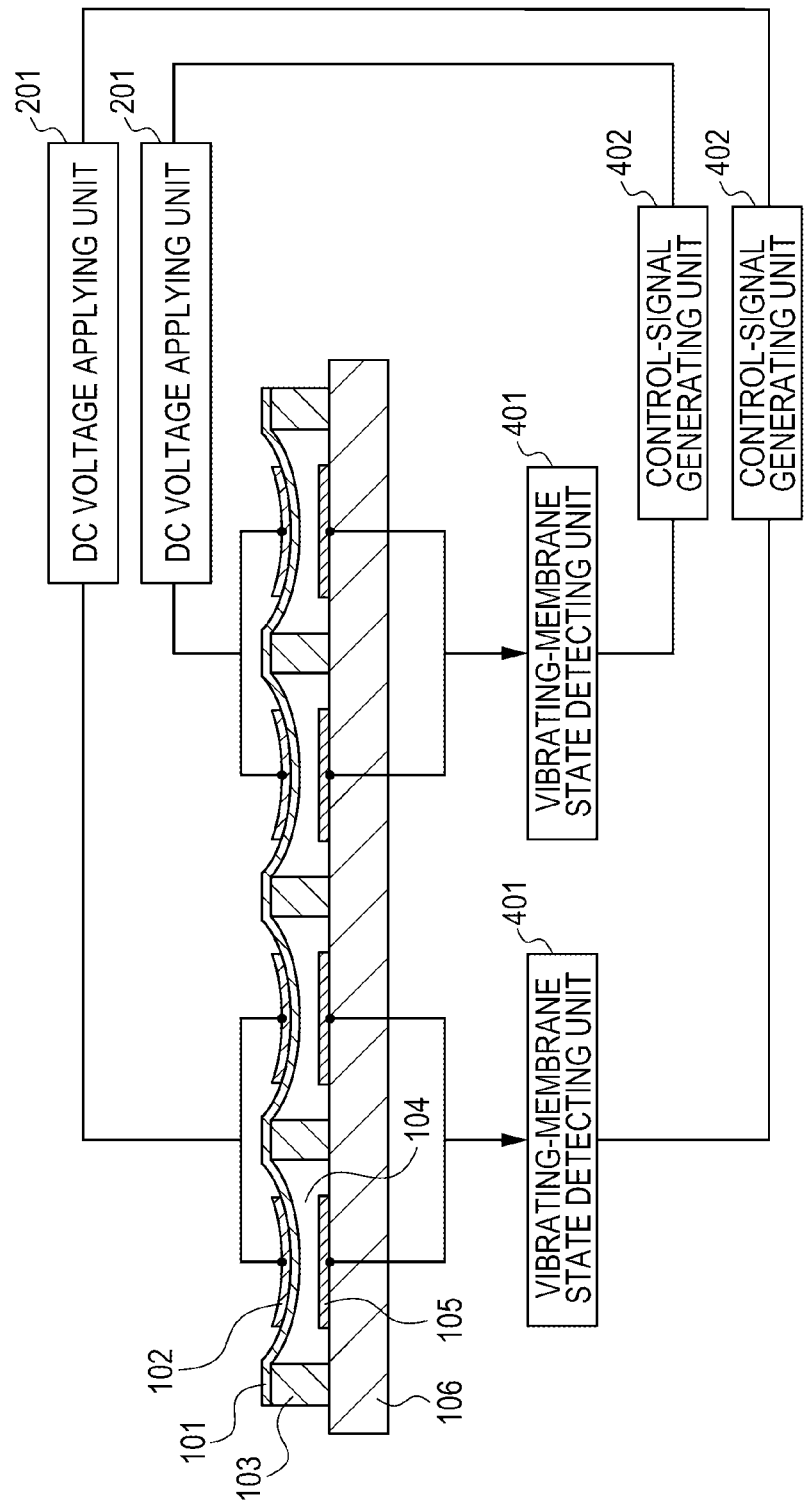
FIG. 4 illustrates an example of the configuration of an electromechanical transducer according to a third embodiment of the present invention.

FIG. 4 illustrates an example of the configuration of an electromechanical transducer according to the third embodiment of the present invention. A vibrating-membrane state detecting unit 401 detects the amount of deflection of the vibrating membranes 101 (this is equivalent to detection of the distance between the upper electrodes and the corresponding lower electrodes). Since the magnitude of a current detected at each lower electrode is in reverse proportion to the square of the distance between the upper electrode and the lower electrode (hereinafter simply referred to as an electrode distance) and is in proportion to the potential difference between the electrodes, the current detecting unit that is connected to the lower electrodes serves as the vibrating-membrane state detecting unit in the third embodiment.

The use of the vibrating-membrane state detecting unit 401 of the third embodiment allows a difference in the amount of deflection of the vibrating membranes between the elements to be detected by, for example, externally transmitting ultrasonic waves of a single frequency and detecting the current output from the lower electrodes for every element. Alternatively, an AC voltage may be superimposed on the DC voltage to be applied to the upper electrodes to detect the current generated by the superimposed AC voltage (described below as a fourth embodiment). A unit other than the unit for detecting the current may be used as the vibrating-membrane state detecting unit to, for example, directly measure the amount of deflection of the vibrating membranes. Specifically, a method of detecting the deflection of the vibrating membrane by using a piezoresistive effect or a method of optically detecting the amount of deflection may be used.

A signal detected by each vibrating-membrane state detecting unit 401 is supplied to the corresponding control-signal generating unit 402. The control-signal generating unit 402 supplies a signal to instruct a DC voltage to be applied to the DC voltage applying unit 201 on the basis of the detected signal so that the vibrating membrane 101 in the CMUT has a desired amount of deflection. The DC voltage applying unit 201 generates a DC voltage on the basis of the signal instructed by the control-signal generating unit 402 and applies the generated DC voltage to the upper electrodes 102. The DC voltage applying unit 201 performing the above operation can be easily formed by the use of, for example, a voltage-control-signal transmitting circuit and a capacitor.

According to the third embodiment, it is possible to detect the amount of deflection of the vibrating membranes 101 for every element. In addition, since the DC voltage can be applied to the upper electrodes in each element so as to reduce a variation in the amount of deflection between the elements, the difference in the amount of deflection between the vibrating membranes can be further reduced. Furthermore, even if the parameters affecting the vibrating membranes 101 are varied clue to the variation with time and/or the change in the environment, it is possible to adjust the state of the vibrating membranes 101 for every element.

Fourth Embodiment

Figure 5:
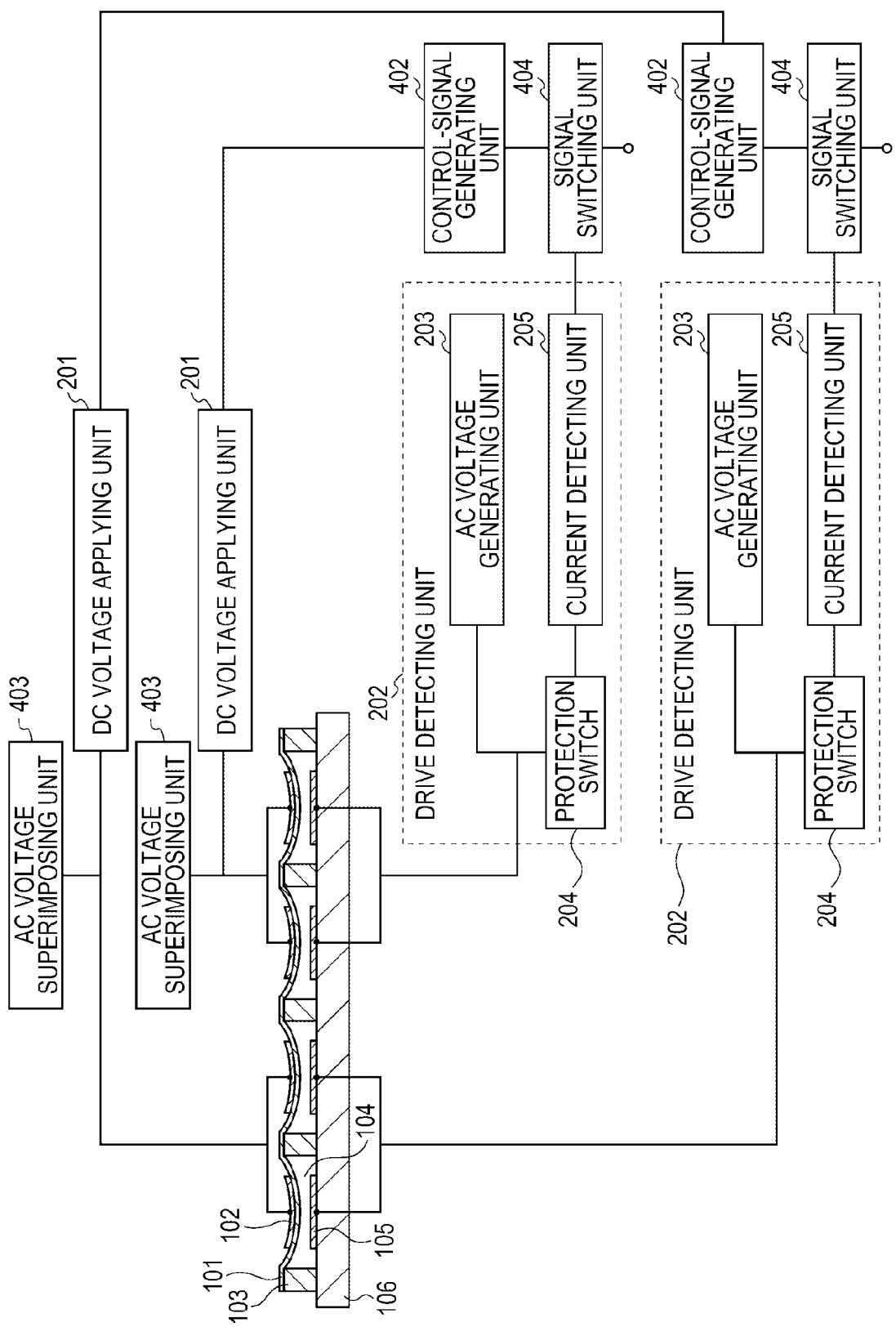
FIG. 5 illustrates an example of the configuration of an electromechanical transducer according to a fourth embodiment of the present invention.

A fourth embodiment of the present invention will now be described with reference to FIG. 5. The fourth embodiment is characterized in that an AC-voltage superimposing unit 403 is provided to superimpose an AC voltage on the DC voltage to be applied to the upper electrodes. The remaining configuration in the fourth embodiment is the same as in the third embodiment. FIG. 5 illustrates an example of the configuration of an electromechanical transducer according to the fourth embodiment of the present invention.

One AC-voltage superimposing unit 403 is connected to the upper electrodes 102 in each element. The AC-voltage superimposing unit 403 superimposes an AC voltage on the DC voltage to be applied to the upper electrodes 102 by the DC voltage applying unit 201 only during a period in which the amount of deflection of the vibrating membranes is detected (the variation in the amount of deflection is measured). The AC voltage superimposed on the DC voltage to be applied to the upper electrodes 102 induces an electric charge on each of the lower electrodes 105 even if the vibrating membrane 101 does not vibrate to cause a current from the lower electrode 105. The current has a value of the magnitude corresponding to the electrode distance between the upper electrode 102 and the lower electrode 105 if the AC voltage to be superimposed has a constant level. Accordingly, the detection of the current by the current detecting unit 205 allows the amount of deflection of the vibrating membranes 101 to be detected as the electrode distance.

The AC voltage to be superimposed may have a frequency that is not equal to the frequency at which the vibrating membrane 101 vibrates. This allows only the electrode distance to be detected without vibrating the vibrating membrane 101 with the AC voltage that is superimposed.

A signal switching unit 404 is connected to an output part of each current detecting unit 205. The signal switching unit 404 supplies an output signal to the control-signal generating unit 402 during a period in which the variation in the amount of deflection is measured. In contrast, the signal switching unit 404 supplies an output signal to, for example, an external image processing apparatus as the output from the sensor during a period in which the variation in the amount of deflection is not measured (the ultrasonic wave is measured on the basis of the vibration of the vibrating membrane). The provision of the signal switching unit 404 allows the current detecting unit 205 to be used both in the measurement of the variation in the amount of deflection and in the measurement of ultrasonic waves.

The control-signal generating unit 402 supplies a signal instructing the DC voltage to the DC voltage applying unit 201 on the basis of the received signal so that the vibrating membranes 101 have a desired amount of deflection.

With the configuration of the fourth embodiment, the superimposition of the AC voltage and the detection of the current generated on the lower electrodes by the current detecting unit allow the amount of deflection of the vibrating membranes to be detected for every element. In addition, setting the frequency of the AC voltage to be superimposed to a value that is not equal to the value of the frequency at which the vibrating membrane vibrates allows the amount of deflection of the vibrating membranes (the electrode distance between the upper and lower electrodes) to be detected without vibrating the vibrating membrane. Accordingly, mechanical vibration characteristics of the vibrating membrane can be removed to achieve the measurement with a higher accuracy. Since the DC voltage can be applied to the upper electrodes for every element so as to reduce the variation in the amount of deflection between the elements, it is possible to reduce the difference in the amounts of deflection between the vibrating membranes. In addition, it is possible to adjust the amount of deflection of the vibrating membranes 101 for every element even if the parameters affecting the vibrating membranes 101 are varied due to the variation with time and/or the change in the environment. Furthermore, since the current detecting unit 205 can be used both in the measurement of the variation in the amount of deflection and in the measurement of ultrasonic waves, it is possible to realize the electromechanical transducer with a simple configuration.

Fifth Embodiment

A fifth embodiment of the present invention will now be described with reference to FIGS. 6A and 6B. The fifth embodiment is characterized in that the current detecting unit 205 switches circuit parameters between in the measurement of the variation in the amount of deflection and in the measurement of ultrasonic waves. The remaining configuration in the fifth embodiment is the same as in the fourth embodiment.

A transimpedance circuit, which is a current-voltage conversion circuit that converts a change in a minute electric current into a voltage, is used to describe the fifth embodiment. FIGS. 6A and 6B illustrate examples of the configuration of the transimpedance circuit, which is the current detecting unit 205 according to the fifth embodiment. Referring to FIGS. 6A and 6B, reference numeral 601 denotes an operational amplifier (op-amp), reference numerals 602, 604, and 606 denote resistors, reference numerals 603, 605, and 607 denote capacitors, and reference numeral 608 denotes a circuit-element switching unit.

Figure 6A:
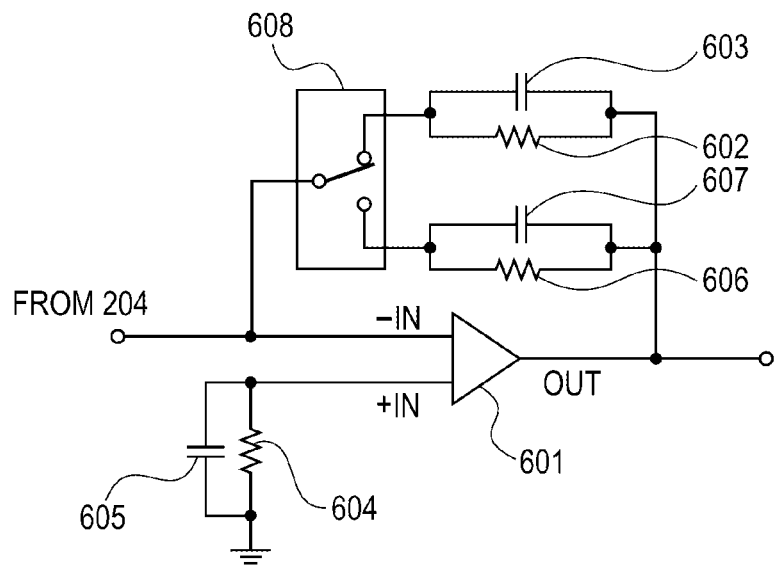
FIG. 6A illustrates an example of the configuration of an electromechanical transducer according to a fifth embodiment of the present invention.
Figure 6B:
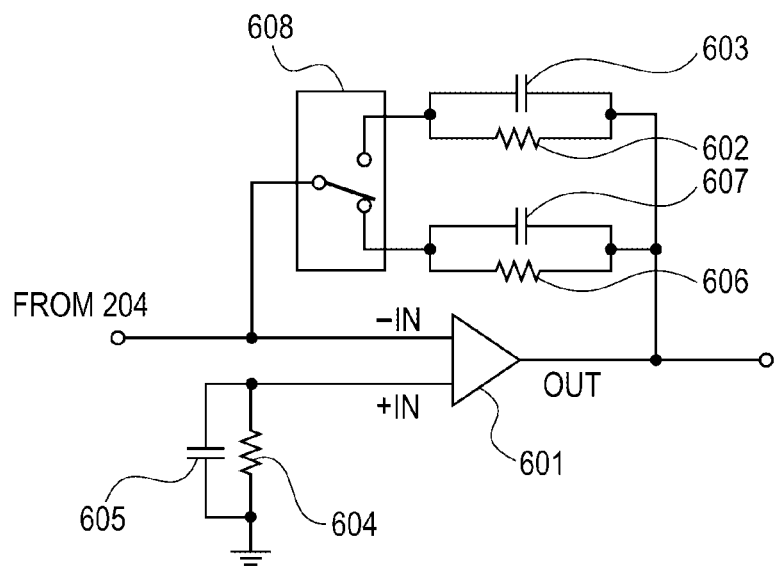
FIG. 6B illustrates another example of the configuration of the electromechanical transducer according to the fifth embodiment of the present invention.
Figure 7:
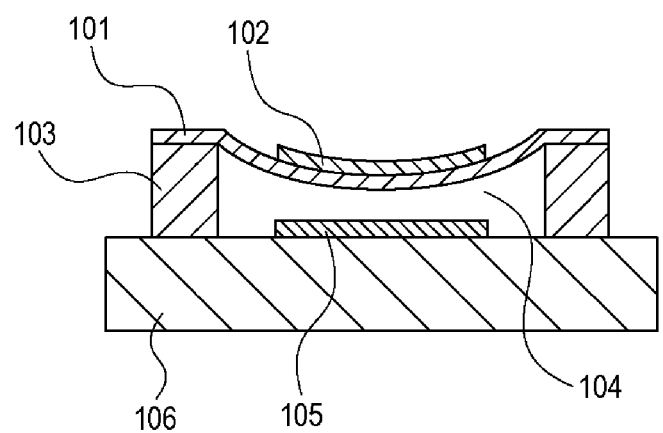
FIG. 7 is a schematic cross-sectional view of a capacitive electromechanical transducer in related art.

In the examples in FIGS. 6A and 6B, the op-amp 601 is connected to positive and negative power supplies. An operation in the measurement of ultrasonic waves will now be described with reference to FIG. 6A. An inverting input terminal −IN of the op-amp 601 is connected to the upper electrodes 102 via the protection switch 204. An output terminal OUT of the op-amp 601 is connected to the inverting input terminal −IN via the resistor 602 and the capacitor 603, which are connected in parallel to each other, and the circuit-element switching unit 608 to feed back an output signal. A non-inverting input terminal +IN of the op-amp 601 is connected to a ground terminal via the resistor 604 and the capacitor 605, which are connected in parallel to each other. The voltage of the ground terminal is equal to an intermediate value between the voltage value of the positive power supply and the voltage value of the negative power supply. The resistor 602 has the same resistance value as that of the resistor 604 and the capacitor 603 has the same capacitance value as that of the capacitor 605. The resistance values of the resistors 602 and 604 and the capacitance values of the capacitors 603 and 605 are parameters matched with the specifications in the measurement of ultrasonic waves.

An operation in the measurement of the variation in the amount of deflection will now be described with reference to FIG. 6B. In the measurement of the variation in the amount of deflection, the circuit-element switching unit 608 is switched and the feedback of an output signal is performed by the resistor 606 and the capacitor 607, which are connected in parallel to each other. The resistance value of the resistor 606 and the capacitance value of the capacitor 607 are parameters matched with the specifications in the measurement of the variation in the amount of deflection.

According to the fifth embodiment, it is possible to perform the current detection in accordance with the specifications including the frequency and the magnitude of the current used in the measurement of the variation in the amount of deflection and the specifications including the frequencies of the ultrasonic waves and the magnitude of the current used in the measurement of ultrasonic waves. Although the circuit-element switching unit 608 is used only in the feedback part of the op-amp 601 in the examples in FIGS. 6A and 6B, the same configuration may be used between the non-inverting input terminal +IN of the op-amp and the ground terminal to switch element constants in accordance with the switch between in the measurement of the variation in the amount of deflection and in the measurement of the ultrasonic waves.

Although the vibrating membrane 101 is described to be operated in a conventional mode in which the gap between the vibrating membrane 101 and the lower electrode 105 constantly exists during the transmission and reception operation of the electromechanical transducer in the above embodiments, the present invention is not limited to the above operation. The present invention is applicable to the operation in another state, such as a collapse mode in which part of the gap between the vibrating membrane 101 and the lower electrode 105 is eliminated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-146936, filed Jun. 19, 2009, which is hereby incorporated by reference herein in its entirety.

REFERENCE SIGNS LIST

101 Vibrating membrane
102 Upper electrode (first electrode)
103 Supporter
104 Gap
105 Lower electrode (second electrode)
106 Substrate
201 DC voltage applying unit
202 Drive detecting unit
203 AC voltage generating unit
204 Protection switch
205 Current detecting unit
301 Lower-electrode through wiring line
302 Upper-electrode through wiring line
303 Through wiring line substrate
401 Vibrating-membrane state detecting unit
402 Control-signal generating unit
403 AC-voltage superimposing unit
404 Signal switching unit
608 Circuit-element switching unit

The invention claimed is:

1. An electromechanical transducer comprising:
a plurality of elements, each element including at least one cell that includes a first electrode and a second electrode opposed to the first electrode with a gap sandwiched therebetween, the first electrodes and the second electrodes being electrically separated for every element;
a direct-current voltage applying unit configured to separately apply a direct-current voltage to the first electrodes for each element; and
a current detecting unit configured to separately detect a current output from the second electrodes for each element.

2. The electromechanical transducer according to claim 1, wherein the number of the first electrodes is the same as that of the second electrodes in each element.

3. The electromechanical transducer according to claim 1, further comprising:
a substrate configured to have one first-electrode through wiring line and one second-electrode through wiring line formed therein for every element.

4. The electromechanical transducer according to claim 1, further comprising:
a control-signal generating unit configured to instruct a direct-current voltage to be applied to the direct-current voltage applying unit on the basis of the current detected by the current detecting unit.

5. The electromechanical transducer according to claim 4, further comprising:
an alternating-current voltage superimposing unit configured to superimpose an alternating-current voltage on the direct-current voltage,
wherein a current caused by the alternating-current voltage is detected by the current detecting unit and the direct-current voltage is instructed to the control-signal generating unit on the basis of the current output from the alternating-current voltage.

6. The electromechanical transducer according to claim 5, further comprising:
a signal switching unit configured to switch an output signal from the current detecting unit so as to be connected to the control-signal generating unit in detection of a current output from the alternating-current voltage and so as not to be connected to the control-signal generating unit in detection of a current output from the vibration of a vibrating membrane on which the first electrode or the second electrode is formed.

7. The electromechanical transducer according to claim 1, wherein each element includes a plurality of cells,
wherein the first electrodes are electrically separated for every element and electrically connected within each element, and
wherein the second electrodes are electrically separated for every element and electrically connected within each element.

8. The electromechanical transducer according to claim 1, wherein the direct-current voltage applying unit is configured to be provided for each element.

9. The electromechanical transducer according to claim 1, wherein the current detecting unit is configured to be provided for each element.

10. The electromechanical transducer according to claim 4, wherein the control-signal generating unit is configured to be provided for each element.

11. The electromechanical transducer according to claim 5, wherein the alternating-current voltage superimposing unit is configured to be provided for each element and to be connected to the first electrode for each element.

12. The electromechanical transducer according to claim 6, wherein the signal switching unit is configured to be provided for each element.

13. The electromechanical transducer according to claim 1, further comprising:
an alternating-current voltage generating unit configured to be provided for each element, to be connected to the second electrode for each element, and to separately apply an alternating-current voltage to the second electrode for each element.

14. The electromechanical transducer according to claim 13, further comprising:
a protection unit configured to protect the current detecting unit from the alternating-current voltage generated by the alternating-current voltage generating unit.

15. The electromechanical transducer according to claim 1, wherein the at least one cell further includes a vibrating membrane on which at least one of the first electrode and the second electrode is formed.

16. The electromechanical transducer according to claim 1, wherein the at least one of the first electrode and the second electrode serves as a vibrating membrane.

17. The electromechanical transducer according to claim 1, wherein the direct-current voltage applying unit is configured to apply a direct-current voltage for each element so as to reduce a variation in transmission characteristics of the ultrasonic waves between the elements according to the current detected by the current detecting unit.

18. The electromechanical transducer according to claim 1, wherein the direct-current voltage applying unit is configured to apply a direct-current voltage for each element so as to reduce a variation in reception characteristics of the ultrasonic waves between the elements according to the current detected by the current detecting unit.

19. The electromechanical transducer according to claim 1, wherein the direct-current voltage applying unit is configured to apply a direct-current voltage for each element so as to reduce a variation in an amount of deflection between the elements according to the current detected by the current detecting unit.

* * * * *